J. L. THOMAS.
COUPLING OR SHACKLE FOR COLLIERY AND LIKE WAGONS.
APPLICATION FILED MAR. 19, 1918.
1,273,689.
Patented July 23, 1918.
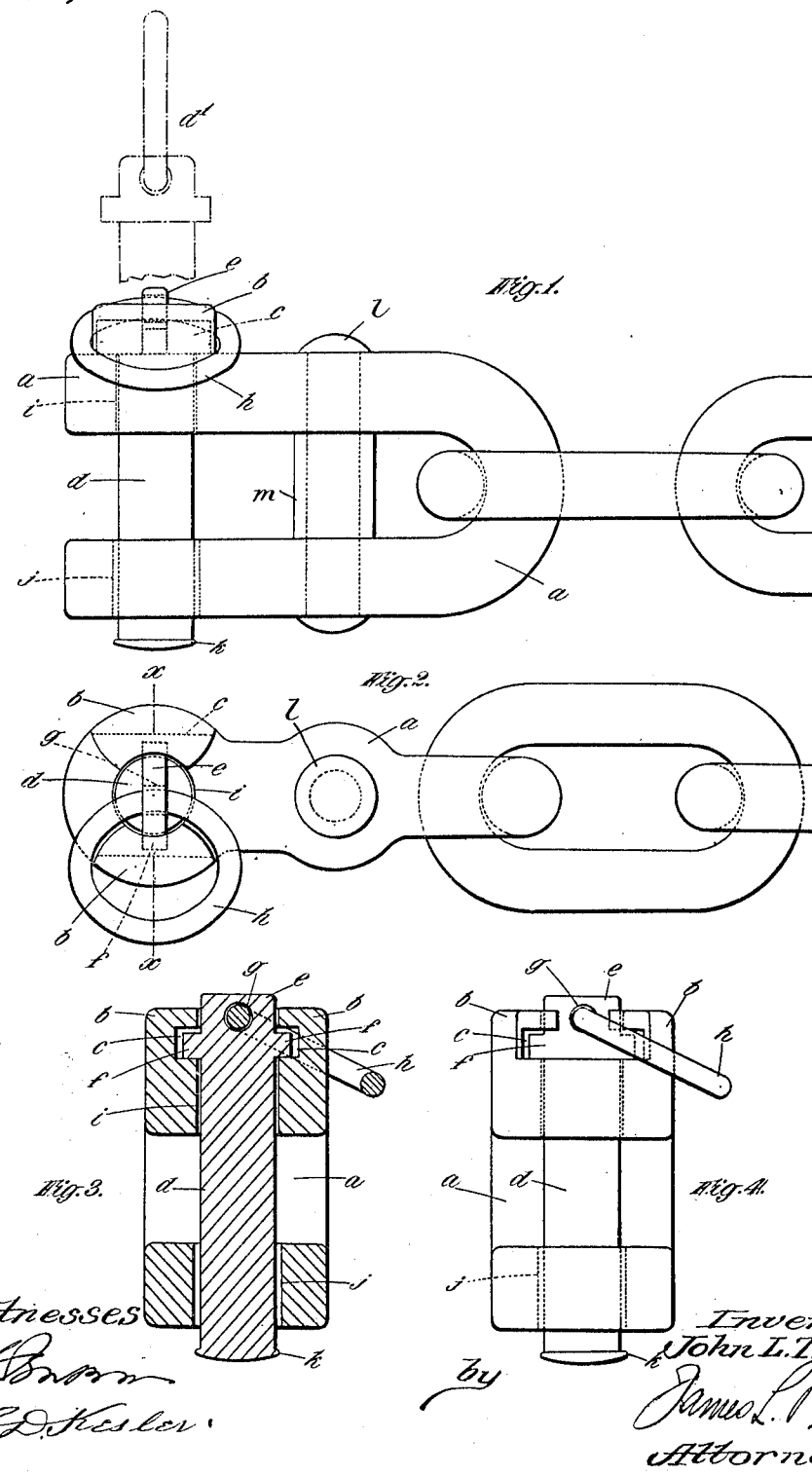

UNITED STATES PATENT OFFICE.

JOHN LEWIS THOMAS, OF MORRISTON, SWANSEA, ENGLAND.

COUPLING OR SHACKLE FOR COLLIERY AND LIKE WAGONS.

1,273,689.      Specification of Letters Patent.      Patented July 23, 1918.

Application filed March 19, 1918. Serial No. 223,357.

*To all whom it may concern:*

Be it known that I, JOHN LEWIS THOMAS, a subject of the King of Great Britain, residing at 7 Beaufort Terrace, Martin street, Morriston, Swansea, England, have invented a new and useful Improved Coupling or Shackle for Colliery and like Wagons, of which the following is a specification.

This invention relates to an improved coupling or shackle for colliery, contractors' and like tramway wagons and is intended to provide a simple construction which will prevent such couplings or shackles from becoming accidentally unfastened when in use.

According to this invention, the shackle or D-link of the coupling is formed or provided with projections one on each side of the hole through which the pin of the coupling is inserted and these projections have undercut grooves or channels into which lugs on the pin are turned so as to restrict or prevent axial movement of the pin. The pin is further furnished with a ring passing loosely through a hole therein and which, when the pin is in position with the lugs thereon within the grooves or channels above mentioned, falls over one or the other of the projections and thus locks the pin against rotary movement, thereby retaining the lugs in the said grooves or channels.

In the accompanying drawing which illustrates my invention—

Figure 1 shows in side elevation one half of a coupling chain with the coupling pin inserted and locked in the shackle or D-link.

Fig. 2 is a plan view thereof.

Fig. 3 is a section on the line $x$—$x$, Fig. 2.

Fig. 4 is an end view of the shackle with its coupling pin.

As shown in this drawing, $a$ is a shackle or D-link having integral projections $b$ on the outer face of one of its limbs. These projections $b$ have grooves or channels $c$ formed therein. A coupling pin $d$, which for the most part is cylindrical, has a flat upper end $e$ from which project lugs $f$. At this end of the pin a hole $g$ is also provided to receive a ring $h$.

When the cylindrical end of the pin $d$ has been inserted in the hole $i$ in one limb of the shackle and the pin has been turned so as to bring the lugs $f$ into the position indicated in broken lines $d'$, Fig. 1, the pin can be lowered until the lugs rest on the shackle, between the projections $b$. By then turning the pin about its own axis, the lugs $f$ are brought into the grooves or channels $c$, as clearly shown in Figs. 1 and 2. The ring $h$ is then allowed to fall over one or the other of the projections $b$ in which position it effectively locks the pin against rotary movement and thus retains the lugs $f$ within the grooves or channels $c$.

In order that the pin $d$ may not be misplaced or lost when the coupling is unfastened, the hole $j$ in the opposite limb of the shackle to that on which the projections $b$ are formed, is made larger than the hole $i$ and the end of the pin is burred or enlarged as at $k$ so that this burred end will pass through the hole $j$ but not through the hole $i$. The pin can then be drawn out sufficiently to allow a part to which the shackle is to be secured, to pass between the limbs of the shackle, but this pin cannot be entirely removed therefrom.

Each of the links or arms of the D-ring or shackle may have an opening formed therein intermediate its length through which a pin or rivet $l$ may extend. A spacing ring $m$ through which the pin or rivet $l$ also passes may be arranged between said links or arms. The pin or rivet $l$ and spacing ring $m$ will thus serve to maintain the links or arms of the shackle in proper spaced relation.

Existing D-links can be provided with projections $b$, to adapt them for use in accordance with this invention. The projections can be fixed or secured to the links in any suitable manner.

It will be observed that in this arrangement the swinging movement of the coupling ring is transverse to the pull on the shackle and is therefore not liable to become accidentally detached in use.

What I claim is:—

1. A coupling or shackle comprising a D-link formed or provided with projections on each side of the coupling pin hole in one limb of this link, said projections being grooved or channeled, a coupling pin provided with lugs which are adapted to be received in said grooves or channels, and a ring threaded through a hole in the pin and arranged so that it can fall laterally over one of the said projections when the pin has been turned to bring the lugs thereon into the said grooves or channels.

2. A coupling or shackle comprising a

D-link formed or provided with projections on each side of the coupling pin hole in one limb of this link, said projections being grooved or channeled, a coupling pin provided with lugs which are adapted to be received in said grooves or channels, and a ring threaded through a hole in the pin and arranged so that it can fall laterally over one of the said projections when the pin has been turned to bring the lugs thereon into the said grooves or channels, and means to prevent the complete withdrawal of the coupling pin from the D-link.

JOHN LEWIS THOMAS.

Witnesses:
CECIL F. PAYNE,
J. KATHLEEN POOLE.

Copies of this patent may be obtained for five cents each, by addressing the "Commissioner of Patents, Washington, D. C."